UNITED STATES PATENT OFFICE.

HENRY C. BECKER, OF CHICAGO, ILLINOIS.

PROCESS OF SEPARATING CAUSTIC ALKALI FROM GLUTEN.

SPECIFICATION forming part of Letters Patent No. 260,736, dated July 11, 1882.

Application filed June 5, 1882. (No model.)

*To all whom it may concern:*

Be it known that I, HENRY C. BECKER, a citizen of the United States, residing at the city of Chicago, in the State of Illinois, have discovered a new and useful process by means of which the greater portion of the gluten which heretofore has been wasted in the manufacture of glucose, grape-sugar, starch, &c., can be saved and utilized, of which the following is a specification.

In making starch, glucose, grape-sugar, and similar articles from corn and other grains the starch and gluten are first separated from the hulls of the grain, the starch and gluten being mixed together in the form of starch-milk. It is customary to separate the gluten from the starch by the use of caustic soda or potash, or something of a similar nature, by mixing the same with the fluid in suitable tanks, and then drawing off the fluid onto starch-tables, the starch settling on the tables, and the gluten being carried away with the fluid and wasted. Centrifugal force is sometimes used for the purpose of separating the starch from the glutinous matter; but, as before, the gluten has been allowed to run away with the fluid and to be wasted.

The object of my invention is to save and utilize this gluten, which heretofore has been wasted, which I accomplish as follows:

I save the fluid which contains the gluten after the starch has been separated from it, placing the fluid in suitable tanks, and allow it to stand from six to twelve hours, at the end of which time the greater portion of the gluten and other nitrogenous matters, if any there be, will have settled to the bottom of the tanks, being combined, however, with the alkali or some part thereof used to separate the gluten from the starch. I then draw off the water and allow it to run away, retaining the glutinous material, which has settled to the bottom of the tanks in the form of a paste. I then place the impure gluten in suitable tanks or vessels, and add to it fresh water, and mix the water and gluten thoroughly, adding water enough to form with the gluten a paste of the consistency of cream. I then treat this paste with sulphurous gas, which can be readily formed by burning about three or four parts of sulphur for one thousand parts of the paste in a suitable furnace, and the gas can be conveyed through a coil surrounded by water and introduced into the paste, under moderate pressure, in any suitable known manner. It will be desirable to stir the paste while treating it with gas. The caustic alkali in the gluten will combine with the gas, forming sulphurous acid, which can be removed more readily than the alkali. I then add considerable fresh water to the paste, mixing the same thoroughly, and let it stand and settle six or eight hours, and then draw off the water, which will remove the sulphurous acid. The washing can be repeated, if necessary. By the means stated the caustic alkali will be substantially removed from the gluten. I then remove or conduct the pasty gluten from the tanks to the one or more hoppers arranged over shaking-sieves made of fine bolting-cloth and placed at an angle, over which sieves are suspended perforated pipes, through which clear cold water flows in jets onto the gluten, for the purpose of removing any slight sulphurous or alkaline taste which may remain. The gluten may pass from the sieves into suitable receptacles, and superfluous water can be removed therefrom by pressure, after which the gluten can be dried in any suitable known manner, and then ground.

The gluten thus obtained can be used for food by mixing the same with cornmeal or flour in equal parts or other proportions. Mixed with the residuum from starch-mills it forms a desirable food for cattle.

Instead of washing the gluten on sieves, centrifugal force can be used while the water is being applied, and thereby the greater portion of the water can also be removed.

I do not claim as new any mechanism; but

What I do claim, and desire to secure by Letters Patent, is as follows:

The process herein described of purifying gluten containing caustic alkali by removing the caustic alkali from the gluten by treating it with sulphurous gas, and washing the same with water, substantially as specified.

HENRY C. BECKER.

Witnesses:
E. A. WEST,
ALBERT H. ADAMS.